US 8,462,945 B2

(12) United States Patent
Passera et al.

(10) Patent No.: US 8,462,945 B2
(45) Date of Patent: *Jun. 11, 2013

(54) PROTECTING VIDEO CONTENT USING VIRTUALIZATION

(75) Inventors: Pablo R. Passera, Alta Gracia (AR); Pablo A. Garralda, Cordoba (AR)

(73) Assignee: Intel Corporation, Santa Clara, CA (US)

(*) Notice: Subject to any disclaimer, the term of this patent is extended or adjusted under 35 U.S.C. 154(b) by 41 days.

This patent is subject to a terminal disclaimer.

(21) Appl. No.: 13/296,838

(22) Filed: Nov. 15, 2011

(65) Prior Publication Data

US 2012/0057700 A1   Mar. 8, 2012

Related U.S. Application Data

(60) Provisional application No. 12/825,267, filed on Jun. 28, 2010.

(51) Int. Cl.
H04N 7/167 (2011.01)

(52) U.S. Cl.
USPC ............. 380/201; 380/200; 711/6; 705/901; 705/904

(58) Field of Classification Search
USPC ... 380/200–242; 705/901, 904, 57–58; 711/6; 360/60; 369/84–85
See application file for complete search history.

(56) References Cited

U.S. PATENT DOCUMENTS

| | | | |
|---|---|---|---|
| 7,552,419 B2* | 6/2009 | Zimmer et al. | 717/121 |
| 7,673,113 B2* | 3/2010 | Sugumar et al. | 711/170 |
| 7,849,286 B2* | 12/2010 | Sugumar et al. | 711/173 |
| 8,213,618 B2* | 7/2012 | Dewan | 380/277 |
| 2006/0155931 A1 | 7/2006 | Birrell et al. | |
| 2007/0226795 A1* | 9/2007 | Conti et al. | 726/22 |
| 2008/0005171 A1 | 1/2008 | Cameron | |
| 2008/0126705 A1 | 5/2008 | Jogand-coulomb et al. | |
| 2009/0006854 A1* | 1/2009 | Alkove et al. | 713/178 |
| 2009/0049220 A1* | 2/2009 | Conti et al. | 710/267 |
| 2009/0323941 A1* | 12/2009 | Sahita et al. | 380/44 |
| 2010/0031325 A1* | 2/2010 | Maigne et al. | 726/4 |
| 2010/0271379 A1* | 10/2010 | Byford et al. | 345/545 |
| 2011/0066786 A1* | 3/2011 | Colbert | 711/6 |
| 2011/0317831 A1* | 12/2011 | Passera et al. | 380/201 |
| 2012/0057700 A1 | 3/2012 | Passera et al. | |

FOREIGN PATENT DOCUMENTS

| | | |
|---|---|---|
| EP | 0961193 | 12/1999 |
| WO | 2012/006015 | 1/2012 |

OTHER PUBLICATIONS

International Preliminary Report on Patentability from related PCT/US2011/042013 mailed Dec. 28, 2012.
International Search Report and Written Opinion received for PCT Application No. PCT/US2011/042013, mailed on Feb. 21, 2012, 12 pages.

* cited by examiner

Primary Examiner — Haresh N Patel
(74) Attorney, Agent, or Firm — Grossman, Tucker, Perreault & Pfleger, PLLC

(57) ABSTRACT

Generally, the present disclosure provides a system and method configured to prevent unauthorized copying of video content in a mobile device. The method may use virtualization technology to prevent unauthorized copying of the premium video content. A user OS may operate in a virtual machine. A hypervisor may be configured to prevent an application and/or a corrupted OS from reading premium video content from video memory. The hypervisor may be configured to prevent direct memory access to the video content in the video memory.

26 Claims, 4 Drawing Sheets

PROTECTING VIDEO CONTENT USING VIRTUALIZATION

CROSS REFERENCE TO RELATED APPLICATIONS

This application is a continuation of U.S. patent application Ser. No. 12/825,267, filed on Jun. 28, 2010, the entire content of which is herein incorporated by reference.

FIELD

The present disclosure relates to protecting video content using virtualization.

BACKGROUND

Mobile computing devices may be configured to display video content, e.g., a movie. The video content may include premium video content and may be protected by, e.g., encryption. Prior to display, the protected video content is typically decrypted. The decrypted, i.e., unprotected, video content may then be susceptible to unauthorized copying.

BRIEF DESCRIPTION OF DRAWINGS

Features and advantages of the claimed subject matter will be apparent from the following detailed description of embodiments consistent therewith, which description should be considered with reference to the accompanying drawings, wherein:

DETAILED DESCRIPTION

Figure 1:
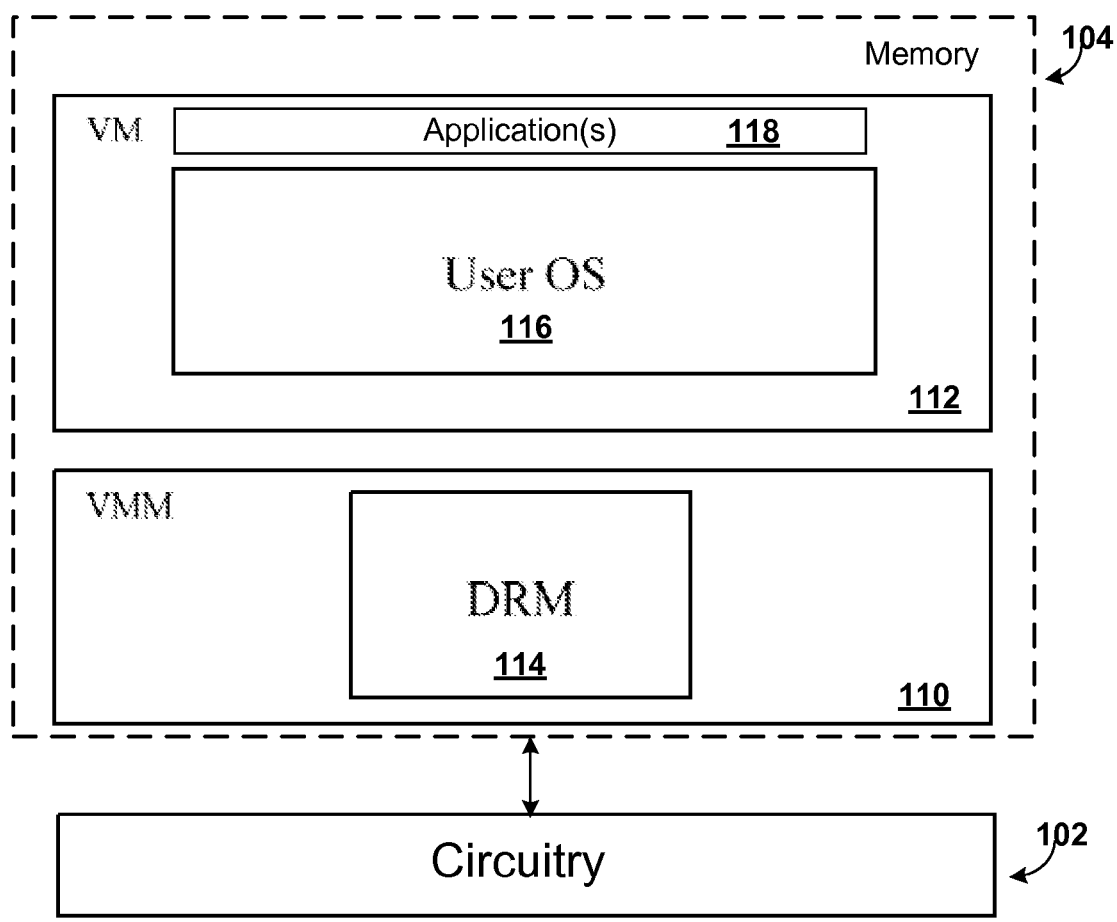
FIG. 1 depicts a high level system block diagram consistent with the present disclosure.

A challenge of preventing unauthorized copying of premium video content in a computing device is preventing unauthorized copying of the premium video content after it has been unprotected, e.g., decrypted, for decoding and display. This challenge is mainly because premium video content is normally protected, e.g., encrypted, but is then unprotected, e.g., decrypted, for display and the decrypted video content may exist in memory in the device, prior to being displayed. Attempts to copy the decrypted video content may originate in software, e.g., malicious and/or corrupted applications running on a processor in the computing device, and/or direct memory accesses of memory locations that contain the decrypted video content.

For example, a computing device may be configured to display premium video content, e.g., a movie. The premium video content may be protected, e.g., encrypted, in order to prevent unauthorized copying. When the premium video content is selected for display, it may be unprotected, e.g., decrypted, and stored in video memory, i.e., frame buffer, prior to display. Without additional preventive measures, the decrypted video content may be read from the video memory and may then be copied.

A movie, i.e., a video file, may include content arranged in one or more frames, e.g., content frames. Content frames include both video content frames and audio content frames. The video file may include metadata, e.g. header(s), that are configured to describe the video file. For example, the metadata includes indicators of locations of the video and audio content frames in the video file. The metadata may further include synchronization information for both the video content frames and the audio content frames. For example, synchronization information may include a time corresponding to each audio and video frame. Generally, it is not necessary to protect metadata, rather, protection may be directed to content frames.

Protection protocols, i.e., encryption and decryption protocols, may include, but are not limited to, DES, AES, WAP, WEP, and/or TLS. Other protection protocols may be used. The DES protocol may comply or be compatible with the Data Encryption Standard, titled FIPS standard FIPS PUB 46 published by the National Bureau of Standards (now the National Institute of Standards and Technology ("NIST")) in 1976, and/or later versions of this standard. The AES protocol may comply or be compatible with the Advanced Encryption Standard, titled U.S. FIPS PUB 197 (FIPS 197), published by the NIST on Nov. 26, 2001, and/or later versions of this standard.

The present disclosure provides a system and method configured to prevent unauthorized copying of premium video content in a mobile device. The method uses virtualization technology to (securely) decrypt the premium video content and to prevent unauthorized access to the decrypted video content. Virtualization technology may typically be used to share a computing device among a plurality of processes, i.e., virtual machines ("VMs"). A hypervisor, also called a virtual machine monitor ("VMM"), is configured to manage sharing computing device circuitry, e.g., a processor and/or I/O device(s). Each VM may be unaware that it is sharing the computing device. The VMM is configured to provide isolation and/or protection of resource(s) used by one VM from access by other VM(s) that may execute on the computing device. The VMM is configured to operate in a "layer" between the VMs and the circuitry.

As described herein, the hypervisor is configured to prevent an application (e.g., a rogue or corrupted application) and/or a corrupted OS from reading decrypted video content from video memory, as described herein. The hypervisor is configured to prevent direct memory access to the decrypted video content in the video memory, as described herein. Advantageously, the method is configured to use the hypervisor to provide the protection without special hardware to get this protection. Some mobile devices may not include hardware protection. Hardware protection may include Intel Virtualization Technology for Directed I/O ("VT-d"), available from Intel Corporation, Santa Clara, Calif., assignee of claimed invention.

A user operating system ("OS") is configured to execute in a VM on the mobile device. The hypervisor is configured to execute on the mobile device and to manage access to mobile device resources by the VM, including user OS and application(s). Video content may be stored in memory accessible by the user OS. In response to a user selecting the premium video content, the hypervisor may decrypt the video content and may inject the decrypted video content into the video memory for display. As will be understood by one skilled in the art, the user OS is configured to access memory using page tables, maintained by the user OS. The hypervisor, in a virtualization system, is configured to maintain page tables that map user virtual memory to physical memory. As described herein, the hypervisor is configured to modify the OS page tables to point to other than decrypted video content (e.g., bogus data) when the video memory contains decrypted video content. In this manner, the user OS and/or an application executing in the VM may be prevented from accessing the decrypted video content in the video memory. Attempts to access the decrypted video content may then yield other than the decrypted video content, e.g., bogus data.

The hypervisor may further protect the decrypted video content from direct memory accesses ("DMAs"). As described herein, when a DMA is initiated, a DMA configuration command may be provided from a user OS, e.g., from a device driver, to a device that is to perform the DMA. The DMA configuration command may include, among other things, address(es) corresponding to data that is to be read for the DMA. As described herein, the hypervisor is configured to monitor DMA commands and to prevent DMA access to video memory that contains the decrypted video content. In this manner, DMA access to decrypted video content may be prevented by the hypervisor without hardware security.

Figure 2:
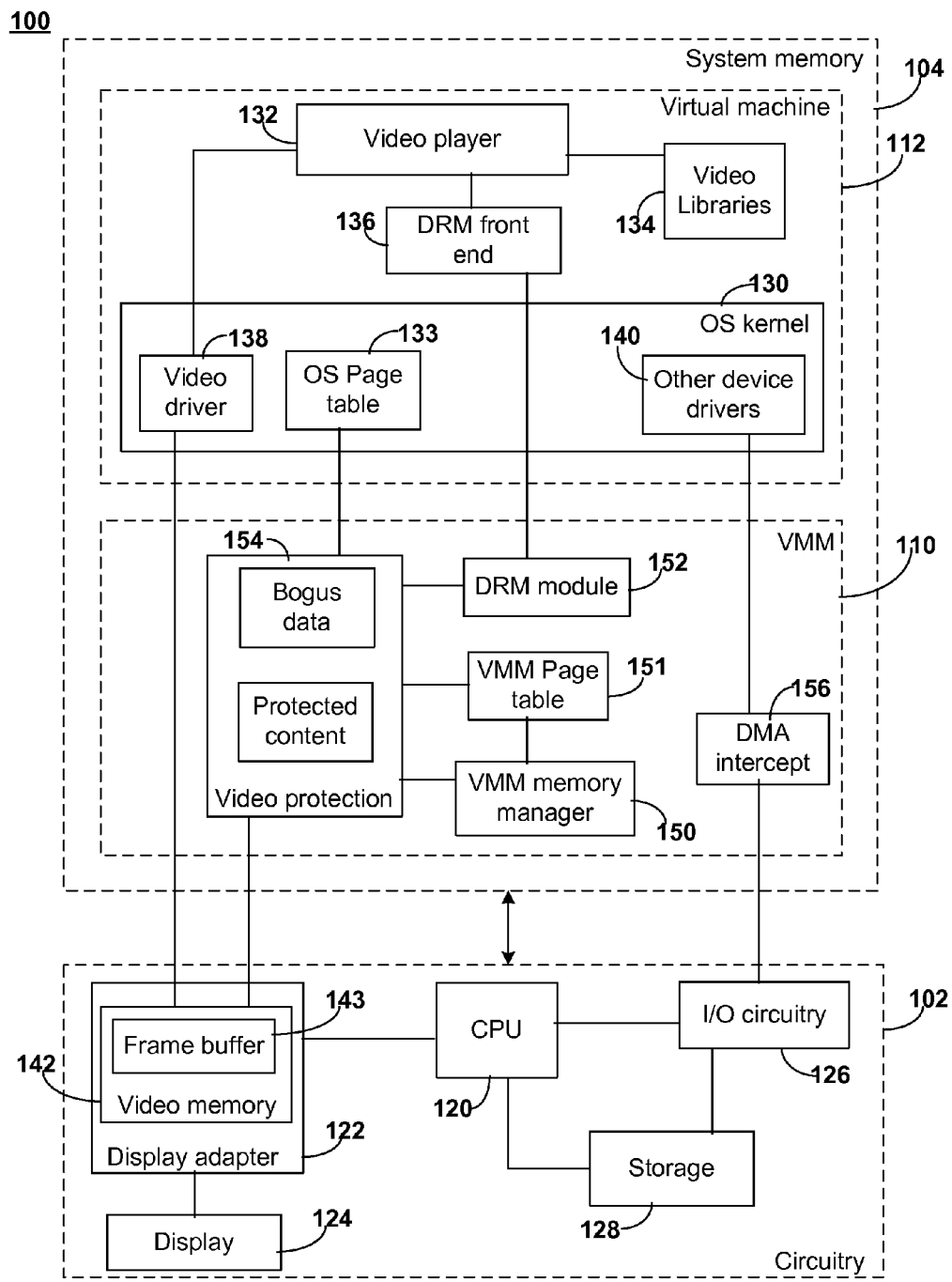
FIG. 2 depicts the system of FIG. 1 illustrating elements of a virtual machine, virtual machine monitor and/or circuitry consistent with the present disclosure.

FIGS. 1 and 2 depict a system 100 consistent with the present disclosure. For example, system 100 may be a mobile device. As used herein, "mobile device" includes any mobile device that is capable of accessing a network, including the Internet. For example, a mobile device may be configured to provide wireless internet access. As will be understood by those skilled in the art, the following categories are non-mutually exclusive and may therefore overlap. Further, the lists of examples provided are representative and not exhaustive. For example, a mobile device may be a "mobile internet device" generally configured to provide wireless internet access, entertainment, information and/or location-based services for a user. Examples of mobile internet devices include, for example, iPad available from Apple Corporation, Nokia 810 Internet Tablet available from Nokia, Gigabyte M528 MID available from Gigabyte Technology Corporation and Viliv MIDs available from Yukyung Technologies Corporation. In another example, a mobile device may be a "smart phone" configured to provide wireless telephony and/or wireless internet access, information and/or location-based services for a user. Examples of smart phones include, for example, iPhone available from Apple Computer Corporation, Blackberry available from Research in Motion, HTC Touch available from HTC Corporation and Motorola Droid available from Motorola, Inc. In yet another example, a mobile device may be "portable media player" generally configured to play media content, e.g., audio and/or video content to a user. Examples of portable media players include Archos "Gen 5" portable media players available from Archos, Inc. and Zen portable media players available from Creative Technology, LTD. In addition, mobile devices may include cellular telephones, personal digital assistants ("PDAs"), handheld game consoles (e.g., Nintendo DS, Sony Play Station Portable ("PSP")), "ultra mobile PCs", "Netbooks" (e.g., mini-notebooks, ultra-portables and/or subnotebooks), notebook computers, and/or other devices known to those skilled in the art. A mobile device may be configured to display, i.e., play, video content such as, but not limited to, movie(s). The video content may be protected premium (i.e., encrypted) video content or may be non-premium (i.e., unencrypted) video content.

FIG. 1 depicts a high level system block diagram of the system 100, illustrating partitioning of processes between a hypervisor "VMM" 110 and a virtual machine "VM" 112. The system 100 includes circuitry 102 coupled to system memory 104. The hypervisor 110 is configured to provide an interface between the VM 112 and circuitry 102, i.e., to manage access of the VM 112 to circuitry 102. System memory 104 includes the hypervisor 110 and the virtual machine 112. For example, the hypervisor 110 may include a DRM module 114 configured to unprotect (e.g., decrypt) premium video content, as described herein. "DRM" corresponds to "digital rights management" and, as used herein, corresponds to access control technologies configured to protect premium content, i.e., configured to prevent unauthorized access to and/or copying of premium content (e.g., video and/or audio content). The VM 112 may include a user operating system "user OS" 116 and one or more application(s) 118. For example, the application(s) 118 may include a video player.

Turning to FIG. 2, there is depicted an example system block diagram of the system 100, consistent with the present disclosure. Circuitry 102 includes a processor ("CPU") 120, a display adapter 122 and a display 124. Circuitry 102 may include I/O circuitry 126 and/or storage 128. CPU 120 may include a plurality of core processing units (hereinafter "cores" or singularly "core") and each core may be configured to execute a plurality of threads. The CPU 120 is configured to execute the hypervisor 110 and/or processes included in the VM 112, e.g., the user OS 116 and/or application(s) 118.

The display adapter 122 may include video memory 142 and may include a graphics processing unit. The video memory 142 may include a frame buffer 143. In some mobile devices, the video memory 142 and/or frame buffer 143 may be included in system memory 104. The display adapter 122 is configured to convert image data stored in video memory 142 into corresponding video data for display on display 124. As used herein, "video content" includes image data and video data. The video memory 142 is configured to receive and store image data from the VM 112 and/or the VMM 110. For example, the VM 112 and/or VMM 110 may access the video memory 142 using memory-mapped I/O. The display adapter 122 is configured to process the image data, i.e., to convert the image data into video data for display on display 124, as will be understood by one skilled in the art. The video memory 142 and/or frame buffer 143 are configured to store image data prior to conversion to video data for display. The image data may include decrypted video content susceptible to unauthorized copying, as described herein.

At least some of the I/O circuitry 126 is configured for direct memory access (DMA), i.e., access to, and transfer of, data stored in memory, without using the CPU 120 to transfer the data. For example, the I/O circuitry 126 may include a network adapter and/or serial port(s). Storage 128 includes tangible computer readable media, as described herein. Although depicted as separate elements for ease of illustration, storage 128 may include memory 104.

The virtual machine 112 includes user OS kernel 130. The kernel 130 includes a video driver 138 and may include other device driver(s) 140, as will be understood by one skilled in the art. The OS kernel 130 includes an OS page table 133. The OS page table 133 is configured to map VM virtual memory to real memory. In a system without virtualization, real memory corresponds to physical memory. In a system with virtualization, real memory may not correspond to physical memory. In this case, the VMM may include a VMM page table to manage mapping from VM virtual memory to physical memory, as described herein.

The virtual machine 112 may include video player 132. Video player 132 is an application that, when executed, is configured to "play" selected video content to a user, e.g., to display a selected movie to a user on display 124. The virtual machine 112 may include one or more video library(ies) 134 configured to store video content, i.e., configured to store one or more movies and/or other video content, as will be understood by one skilled in the art. For example, a user may "request" display of video content by selecting the desired video content from, e.g., video library(ies) 134 and/or launching video player 132. Virtual machine 112 may include a module, e.g., DRM front end 136, configured to provide communication between the VM 112 and the hypervisor 110. For example, the DRM front end 136 may transfer selected protected premium video content from the VM 112 to the hypervisor 110.

The OS kernel 130 may include a video driver 138 configured to provide an interface between the OS kernel 130 and the display adapter 122. The OS kernel may further include other device driver(s) 140 configured to provide an interface between the VM 112 and circuitry 102, e.g., I/O circuitry 126. In a typical virtualized system, i.e., a system including a hypervisor, the hypervisor may provide an additional interface between the device drivers and the circuitry 102, in order for the hypervisor to manage sharing the circuitry 102 among a plurality of VMs.

The VMM 110 may include a VMM memory manager 150, a VMM page table 151 and a DRM module 152. The VMM page table 151 is configured to map VM virtual memory to system physical memory 104. For example, VMM page table 151 may be a shadow page table that maps VM virtual memory directly to physical memory. In another example, OS page table may map VM virtual memory to real memory, as described herein. Continuing with this example, the VMM page table 151 may then be configured to map the real memory to physical memory.

The VMM memory manager 150 is configured to manage allocation and/or access to memory 104 by, e.g., VM 112. The DRM module 152 is configured to unprotect, e.g., decrypt, premium video content received from the DRM front end 136. The decrypted video content may then be stored in video memory 142. The DRM module 152 may be configured to verify a policy associated with the video content. For example, the policy may include a number of times that a video may be displayed and whether or not the number has been reached. In another example, the policy may include an "expiration date", i.e., a date after which the video content may not be displayed.

The VMM 110 includes a video protection module 154 and a DMA intercept 156, consistent with the present disclosure. The video protection module 154 is configured to receive decrypted video content from, e.g., the DRM module 152, and to store the decrypted video content in video memory 142 and/or frame buffer 143. The video protection module 154 is further configured to update the OS page table 133 to point to memory location(s) that contain other than the decrypted video content, e.g., bogus data, as described herein. The DMA intercept 156 is configured to monitor DMA configuration commands from the VM 112, e.g., from kernel 130. The DMA intercept 156 is further configured to prevent access to video memory 142 and/or frame buffer 143 that contains the decrypted video content, as described herein.

Figure 3:
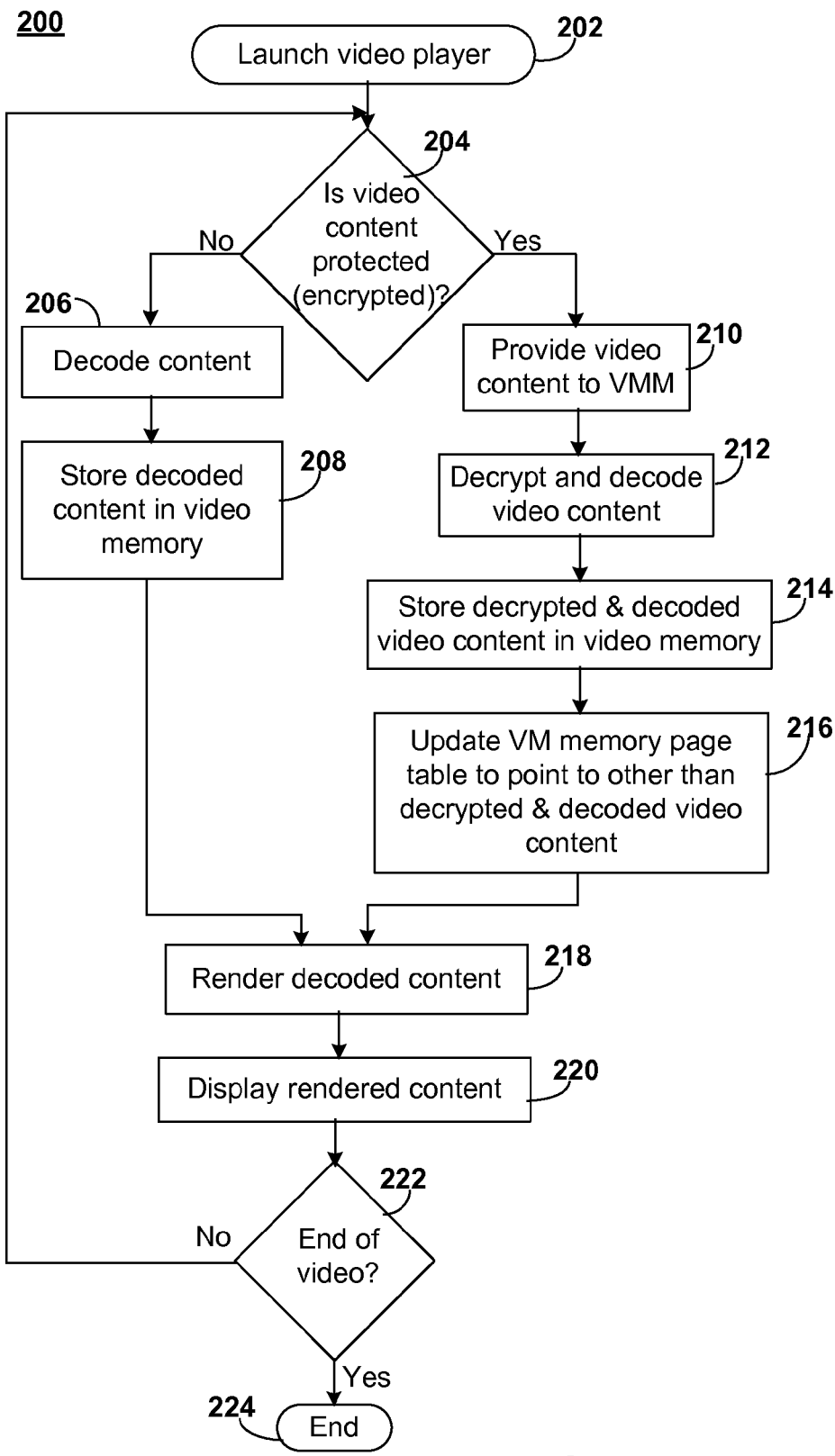
FIG. 3 depicts a flowchart of example operations configured to prevent unauthorized virtual machine access of video content consistent with the present disclosure.

FIG. 3 depicts a flow chart 200 of operations configured to prevent unauthorized access to and/or copying of video content. For example, the operations of flow chart 200 are configured to prevent a rogue and/or corrupted application and/or user OS, e.g., user OS 116, from reading decrypted video content stored in video memory 142. A first portion of the operations of flow chart 200 may be performed by the VM 112, e.g., operations on video content including protected premium video content and/or non-premium video content. A second portion of the operations of flow chart 200 may be performed by the VMM 110, e.g., operations associated with decrypting video content and/or operations associated with decrypted video content.

Program flow may begin with operation 202, launch video player. For example, a user may select video content, e.g., a movie, to display. In other words, VM 112 may receive a request to display video content. In response to the user selection, video player, e.g., video player 132, may begin execution and/or may prepare to display the selected video content. Operation 204 may include determining whether the selected video content is protected (e.g., encrypted) video content or non-premium video content. If the selected video content is not encrypted video content, the video content may be decoded at operation 206 and stored in video memory 142 at operation 208. Operation 206 may include retrieving the video content from storage 128. Program flow may then proceed to operation 218.

If the selected video content is protected video content, the video content may be provided to the VMM 110 at operation 210. For example, DRM front end 136 may provide the video content to the VMM 110 and/or to the DRM module 152. Operation 210 may include retrieving the video content from storage 128. Operation 210 may include communication between the DRM front end 136 and the DRM module 152 indicating that protected premium video content has been selected for display and/or an identifier associated with the selected video content. Operation 210 may include storing the video content in a region of memory associated with the VMM 110.

Operation 212 includes decrypting and decoding the protected premium video content. For example, the DRM module 152 is configured to decrypt the video content and may be configured to decode the decrypted video content. The decrypted and decoded video content, e.g., image data, may be stored in video memory 142, e.g., in frame buffer 143, at operation 214. For example, the video protection module may inject the decrypted and decoded image data into video memory 142.

Operation 216 may include updating the OS page table 133 to point to data other than decrypted and decoded video content, e.g., bogus data. For example, the video protection module 154 of the VMM 110 may modify the OS page table 133 and/or the VMM page table 151 so that the OS page table 133 entries corresponding to the decrypted video content point to memory locations that contain data other than the decrypted video content, e.g., bogus data. Accordingly, attempts to read video memory 142 by application(s) 118 and/or user OS 116 in the VM 112 will result in reading, e.g., the bogus data, rather than the decrypted video content.

At operation 218, decoded video content may be rendered. For example, the decoded video content may be rendered by the display adapter 122. The decoded video content may be non-premium video content stored in video memory 142 and/or frame buffer 143 by the VM 112 or may be decrypted video content injected into video memory and/or frame buffer 143 by the video protection module 154. Operation 220 may include displaying the rendered content, e.g., on display 124.

Whether an end of the video content has been reached may be determined at operation 222. If the end of the video content has been reached, program flow may end 224. If the end of the video content has not been reached, program flow may proceed to operation 204, determining whether the video content is protected.

In this manner, unauthorized copying of decrypted premium video content may be prevented. Video content, including protected (e.g., encrypted) premium video content and non-premium (e.g., unencrypted) video content may be accessed by the VM 112 and decrypting operations associated with the protected premium video content may be performed by the VMM 110. The VM 112 may be prevented from accessing, e.g., reading, video memory 142 by the VMM 110, for example, by modifying the OS page table 133 to point to memory location(s) containing data other than the decrypted video content in video memory 142, e.g., to point to memory location(s) containing bogus data. Additional measures may be desirable configured to prevent direct, e.g., DMA, access to the decrypted video content in video memory 142.

For example, the user OS 116 may generate a DMA configuration command to initiate a DMA transfer of data by a device, e.g., I/O circuitry 126, without processor involvement in the transfer. Continuing with this example, a device driver in the other device drivers 140 in the OS kernel 130 may generate the DMA configuration command. The DMA configuration command may include one or more address(es) and/or address indicator(s), e.g., pointer(s), that are configured to specify location(s) of the data to be transferred. The DMA configuration command may include device-specific parameters, as will be understood by one skilled in the art. A rogue and/or corrupted device driver may generate a DMA configuration command configured to read video memory 142 and/or frame buffer 143, that contains decrypted video content allowing unauthorized access to, and possibly, copying of the decrypted video content.

Figure 4:
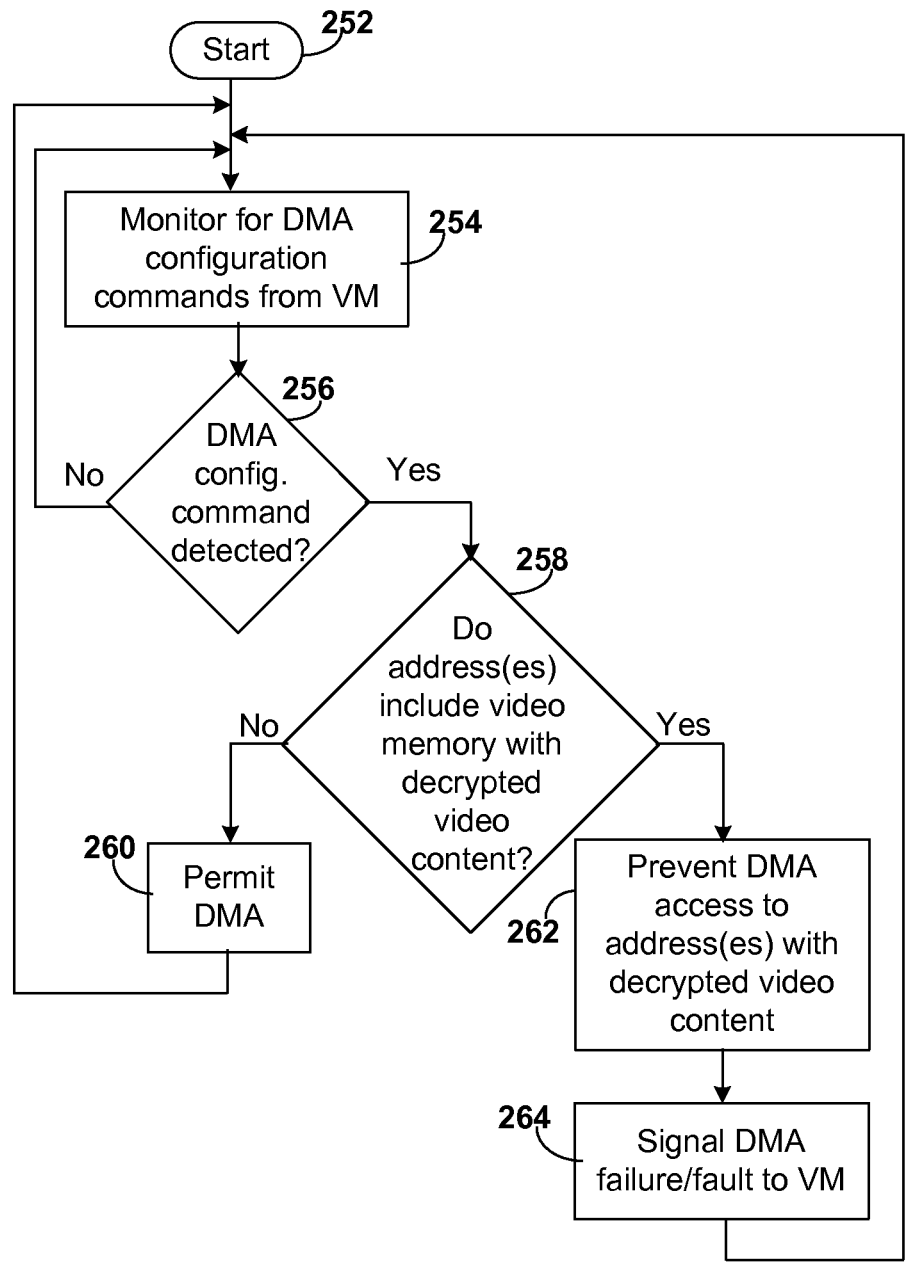
FIG. 4 depicts a flowchart of example operations configured to prevent direct memory access of video content consistent with the present disclosure.

FIG. 4 depicts another flow chart 250 of operations configured to prevent unauthorized access to decrypted video content. Operations of flow chart 250 are configured to prevent direct memory access ("DMA") of decrypted video content in video memory 142. The operations of flow chart 250 may be performed by the VMM 110. For example, the operations of flow chart 250 may be performed, at least in part, by DMA intercept module 156.

Program flow may begin with Start 252. It is assumed that prior to Start 252, a user has selected video content to display, i.e. has requested to display video content, e.g., a movie. Operation 254 may include monitoring for DMA configuration commands from the VM, e.g., VM 112. For example, DMA intercept module 156 may be configured to monitor for DMA configuration commands.

Whether a DMA configuration command has been detected may be determined at operation 256. If a DMA configuration command is not detected, program flow may proceed to operation 254, monitoring for DMA configuration commands from the VM. If a DMA configuration command is detected, whether the address(es) specified by the DMA configuration command include video memory containing decrypted video content may be determined at operation 258. If the address(es) specified by the DMA configuration command do not include video memory containing decrypted video content, the DMA may be permitted at operation 260. Program flow may then proceed to operation 254, monitoring for DMA configuration commands from the VM. If the address(es) specified by the DMA configuration command include video memory containing decrypted video content, DMA access to the decrypted video content may be prevented at operation 262 by, e.g., DMA intercept module 156. Operation 264 may include signaling a DMA failure and/or fault to the VM 112. Program flow may then proceed to operation 254, monitoring for DMA configuration commands from the VM.

In this manner, unauthorized access to and/or copying of decrypted video content by DMA transfer may be prevented. The unauthorized copying may be prevented by the VMM, via, e.g., the DMA intercept module 156, without hardware protection.

DMA configuration commands may be device-specific. For example, as described herein, I/O circuitry may include, but is not limited to, a network adapter and/or a serial port. Each device, e.g., network adapter and/or serial port, may have an associated DMA configuration command. A format of each DMA configuration command may depend on the associated device. Accordingly, operation 258 may include identifying the associated device in order to identify the format of the DMA configuration command to facilitate determining whether the address(es) include address(es) of video memory containing decrypted video content. As may be appreciated by one skilled in the art, mobile devices, e.g., mobile internet devices, may include a limited amount of I/O circuitry, i.e., a limited number of devices, and the devices may generally not be user changeable. Accordingly, the DMA intercept module 156 may be configured with "knowledge" of which I/O circuitry exists on the mobile device so that identifying the format of the DMA configuration command may be relatively straightforward.

A system and method consistent with the present disclosure are configured to prevent unauthorized access to and/or copying of video content on a mobile device. The mobile device may not include hardware protection against such access and/or copying. The method is configured to use virtualization technology, i.e., a virtual machine and a hypervisor, to provide separation between processes associated with video content (including encrypted and unencrypted video content) and processes associated with decrypted premium video content. The hypervisor is configured to prevent access to decrypted video content in video memory by modifying the OS page table to point to other than the decrypted video content, e.g., bogus data. The hypervisor is further configured to monitor DMA configuration commands to prevent DMA access to the decrypted video content in video memory. Advantageously, the disclosed system and method are configured to prevent unauthorized copying without using hardware protection.

Of course, while FIGS. 3 and 4 depict example operations according to some embodiments, it is to be understood that in other embodiments all of the operations depicted in FIG. 3 and/or FIG. 4 may not be necessary. Indeed, it is fully contemplated herein that other embodiments of the present disclosure may include subcombinations of the operations depicted in FIG. 3 and/or FIG. 4 and/or additional operations. Thus, claims directed to features and/or operations that are not exactly shown in one drawing are deemed within the scope and content of the present disclosure.

Embodiments of the methods described herein may be implemented using a processor and/or other programmable device. To that end, the methods described herein may be implemented on a tangible computer readable medium having instructions stored thereon that when executed by one or more processors perform the methods. The storage medium may include any type of tangible medium, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

For example, memory 104 and/or memory associated with the circuitry 102 may comprise one or more of the following types of memory: semiconductor firmware memory, programmable memory, non-volatile memory, read only memory, electrically programmable memory, random access memory, flash memory, magnetic disk memory, and/or optical disk memory. Either additionally or alternatively, memory 104 and/or memory associated with the circuitry 102 may comprise other and/or later-developed types of computer-readable memory.

Unless specifically stated otherwise, as apparent from the preceding discussions, it is appreciated that throughout the specification discussions utilizing terms such as "operations," "processing," "computing," "calculating," "determining," or the like, refer to the action and/or processes of a computer or computing system, or similar electronic computing device or apparatus, that manipulate and/or transform data represented as physical, such as electronic, quantities within the computing system's registers and/or memories into other data similarly represented as physical quantities within the computing system's memories, registers or other such information storage, transmission or display devices.

"Circuitry", as used in any embodiment herein, may comprise, for example, singly or in any combination, hardwired circuitry, programmable circuitry, state machine circuitry, and/or firmware that stores instructions executed by programmable circuitry.

According to one aspect there is disclosed a method. The method may include receiving a request by a virtual machine ("VM") to display video content by a mobile device, the virtual machine comprising a user operating system ("OS") and an OS page table; transferring the video content to a virtual machine monitor ("VMM"); decrypting the video content by the VMM to yield decrypted video content; storing the decrypted video content in video memory using the VMM; and updating the OS page table, by the VMM, so that a pointer corresponding to the decrypted video content in the video memory points to a memory location containing data other than the decrypted video content.

According to another aspect there is disclosed an article, including a tangible storage medium having instructions stored thereon which when executed by a processor may result in the following operations: receiving a request by a virtual machine ("VM") to display video content by a mobile device, the virtual machine comprising a user operating system ("OS") and an OS page table; transferring the video content to a virtual machine monitor ("VMM"); decrypting the video content by the VMM to yield decrypted video content; storing the decrypted video content in video memory using the VMM; and updating the OS page table, by the VMM, so that a pointer corresponding to the decrypted video content in the video memory points to a memory location containing data other than the decrypted video content.

In yet another aspect there is disclosed a mobile device. The mobile device may include a processor; a display; and a memory configured to store a virtual machine ("VM") comprising a user operating system ("OS") and an OS page table, and a virtual machine monitor ("VMM"), wherein when the VM and VMM are executed on the processor and the VM receives a request to display video content, the VM causes the processor to transfer the video content to the VMM; and the VMM causes the processor to: decrypt the video content in the VMM to yield decrypted video content; store the decrypted video content in a video memory; and update the OS page table so that a pointer corresponding to the decrypted video content in the video memory points to a memory location containing other than the decrypted video content.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. A method comprising:
   receiving a request by a virtual machine ("VM") to display video content by a mobile device, the virtual machine comprising a VM virtual memory;
   transferring the video content to a virtual machine monitor ("VMM"), the VMM comprising a VMM page table;
   decrypting the video content by the VMM to yield decrypted video content;
   storing the decrypted video content in at least one of a video memory and a frame buffer using the VMM;
   mapping the VM virtual memory to a system physical memory with the VMM page table, such that a pointer corresponding to the decrypted video content in at least one of the video memory and the frame buffer points to a memory location containing data other than the decrypted video content.

2. The method of claim 1, wherein the VMM page table is a shadow page table that maps the VM virtual memory directly to the system physical memory.

3. The method of claim 1, further comprising:
   monitoring, with a direct memory access (DMA) intercept, DMA configuration commands from the VM;
   determining whether a detected DMA configuration command includes an address in at least one of the video memory and frame buffer that contains the decrypted video content using the VMM; and
   if the address contains the decrypted video content, preventing access to the address with the DMA intercept.

4. The method of claim 3, further comprising signaling a direct memory access failure to the VM if access to the address in the video memory is prevented.

5. The method of claim 1, further comprising determining whether displaying the video content is allowed based on a protection policy.

6. The method of claim 1, further comprising determining whether the video content comprises decrypted video content.

7. The method of claim 1, further comprising decoding the video content and providing the decoded video content for display by the mobile device.

8. The method of claim 1, wherein the VM comprises a DRM front end and the VMM comprises a video protection module and a DRM module.

9. The method of claim 1, wherein the mobile device is selected from the group consisting of mobile internet devices, smart phones, portable media players, personal digital assistants, handheld game consoles, ultra-mobile PCs, Netbooks and notebook computers.

10. At least one non-transitory storage medium having instructions stored thereon which when executed by a processor result in the following operations comprising:
    receiving a request by a virtual machine ("VM") to display video content by a mobile device, the virtual machine comprising a VM virtual memory;
    transferring the video content to a virtual machine monitor ("VMM"), the VMM comprising a VMM page table;
    decrypting the video content by the VMM to yield decrypted video content;
    storing the decrypted video content in at least one of a video memory and a frame buffer using the VMM;
    mapping the VM virtual memory to a system physical memory with the VMM page table, such that a pointer corresponding to the decrypted video content in at least one of the video memory and the frame buffer points to a memory location containing data other than the decrypted video content.

11. The medium of claim 10, wherein the VMM page table is a shadow page table that maps the VM virtual memory directly to the system physical memory.

12. The medium of claim 11, wherein the instructions that when executed by the processor result in the following additional operations comprising:
signaling a direct memory access failure to the VM if access to the address in the video memory is prevented.

13. The medium of claim 10, wherein the instructions that when executed by the processor result in the following additional operations comprising:
monitoring with a direct memory access (DMA) intercept, DMA configuration commands from the VM;
determining whether a detected DMA configuration command includes an address in at least one of the video memory and frame buffer that contains the decrypted video content using the VMM; and
if the address contains the decrypted video content, preventing access to the address with the DMA intercept.

14. The medium of claim 10, wherein the instructions that when executed by the processor result in the following additional operations comprising:
determining whether displaying the video content is allowed based on a protection policy.

15. The medium of claim 10, wherein the instructions that when executed by the processor result in the following additional operations comprising:
determining whether the video content comprises decrypted video content.

16. The medium of claim 10, wherein the instructions that when executed by the processor result in the following additional operations comprising:
decoding the video content and providing the decoded video content for display by the mobile device.

17. The medium of claim 10, wherein the mobile device is selected from the group consisting of mobile internet devices, smart phones, portable media players, personal digital assistants, handheld game consoles, ultra-mobile PCs, Netbooks and notebook computers.

18. A system, comprising:
a processor;
a display; and
a memory configured to store a virtual machine ("VM") comprising a VM virtual memory, and a virtual machine monitor ("VMM") wherein when the VM and VMM are executed on the processor and the VM receives a request to display video content,
the VM causes the processor to:
transfer the video content to the VMM; and
the VMM causes the processor to:
decrypt the video content to yield decrypted video content;
store the decrypted video content in a video memory; and
map the VM virtual memory to a system physical memory using a VMM page table, such that a pointer corresponding to the decrypted video content in the video memory points to a memory location containing data other than the decrypted video content.

19. The system of claim 18, wherein the VMM page table is a shadow page table that maps the VM virtual memory directly to the system physical memory.

20. The system of claim 18, wherein the VMM further comprises a direct memory access (DMA) intercept, and the VMM further causes the processor to:
monitor DMA configuration commands from the VM with the direct memory access (DMA) intercept;
determine whether a detected DMA configuration command includes an address in at least one of the video memory and frame buffer that contains the decrypted video content using the VMM; and
if the address contains the decrypted video content, preventing access to the address with the DMA intercept.

21. The system of claim 20, wherein the VMM further causes the processor to signal a direct memory access failure to the VM if access to the address in the video memory is prevented.

22. The system of claim 18, wherein at least one of the VM and the VMM further cause the processor to determine whether displaying the decrypted content is allowed based on a protection policy.

23. The system of claim 18, wherein the VM further causes the processor to determine whether the video content comprises decrypted video content.

24. The system of claim 18, wherein the at least one of the VM and the VMM causes the processor to:
decode the video content; and
display the decoded video content on the display.

25. The system of claim 18, wherein the VM comprises a DRM front end and the VMM comprises a video protection module and a DRM module.

26. The system of claim 18, wherein the system is selected from the group consisting of mobile internet devices, smart phones, portable media players, personal digital assistants, handheld game consoles, ultra-mobile PCs, Netbooks and notebook computers.

* * * * *

UNITED STATES PATENT AND TRADEMARK OFFICE
CERTIFICATE OF CORRECTION

PATENT NO. : 8,462,945 B2  
APPLICATION NO. : 13/296838  
DATED : June 11, 2013  
INVENTOR(S) : Pablo R. Passera et al.

Page 1 of 1

It is certified that error appears in the above-identified patent and that said Letters Patent is hereby corrected as shown below:

On the Title Page, Item (60), in column 1, under "Related U.S. Application Data", line 1, delete "Provisional" and insert -- Continuation of --, therefor.

Signed and Sealed this  
Twentieth Day of August, 2013

Teresa Stanek Rea  
*Acting Director of the United States Patent and Trademark Office*